United States Patent [19]

Wang

[11] Patent Number: 5,172,745
[45] Date of Patent: Dec. 22, 1992

[54] AUTOMOTIVE WINDOW SCREEN CONTROL DEVICE

[76] Inventor: Fore S. Wang, No. 174, La. 131, Sec. 2, True Hsing Rd., Panchiao, Taipei, Taiwan

[21] Appl. No.: 803,203

[22] Filed: Dec. 6, 1991

[51] Int. Cl.$^5$ .............................................. B60J 1/20
[52] U.S. Cl. ................................ 160/370.2; 160/265; 160/23.1
[58] Field of Search .................. 160/370.2, 265, 319, 160/310, 62, 71, 80, 23.1

[56] References Cited

U.S. PATENT DOCUMENTS

| | | | |
|---|---|---|---|
| 3,306,345 | 2/1967 | Youngs | 160/319 X |
| 4,813,198 | 3/1989 | Johnston et al. | 160/265 X |
| 4,815,515 | 3/1989 | Lee | 160/310 X |
| 4,836,263 | 6/1989 | Ament | 160/71 X |
| 4,869,542 | 9/1989 | Lin | 160/370.2 X |
| 4,874,026 | 10/1989 | Worrall | 160/370.2 X |
| 4,898,224 | 2/1990 | Woodworth | 160/370.2 X |
| 5,088,543 | 2/1992 | Bilbrey | 160/310 |

Primary Examiner—David M. Purol
Attorney, Agent, or Firm—Bucknam and Archer

[57] ABSTRACT

An automotive window screen control device, has a motor-driven winding device to hoist a screen on a telescopic tube above a tube holder, and a screen holder fastened in the tube holder above a base, onto which the winding device is supported, to hold the screen, wherein the screen holder has tenons alternatively inserted in two paralleled lines of holes on the tube holder for adjusting the angular position of the screen.

3 Claims, 1 Drawing Sheet

AUTOMOTIVE WINDOW SCREEN CONTROL DEVICE

BACKGROUND AND SUMMARY OF THE INVENTION

The present invention relates to an automotive window screen control device which utilizes a winding device to take up or let down a wire so as to hoist a screen on a telescopic post.

During the summer season, window screens may be used to protect against the radiation of the sun. Several automotive window screen devices have been known for this purpose. An automotive window screen device generally has hook or hanger means for hanging over a window glass. The common disadvantage of the known automotive window screen devices is that the hanging angle is not adjustable once they are fastened to the body of a car.

The present invention has been accomplished to eliminate the aforesaid disadvantage. It is therefore an object of the present invention to provide an automotive window screen control device which can be conveniently adjusted to change the hanging angle of the screen thereof. It is another object of the present invention to provide an automotive window screen control device which utilizes a motor-driven winding device to hoist a screen on a telescopic tube.

DETAILED DESCRIPTION OF THE PREFERRED EMBODIMENT

Figure 1:
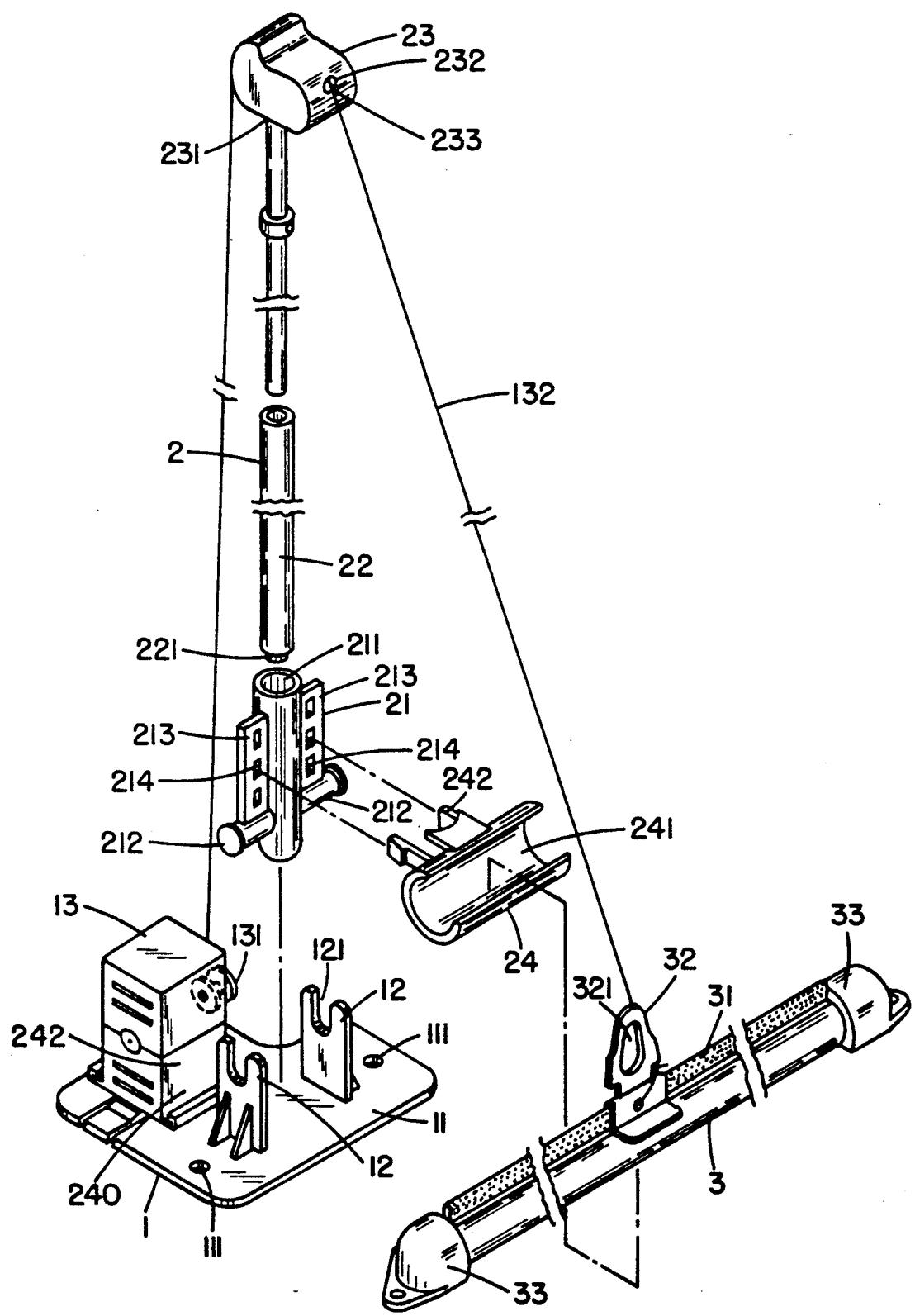
FIG. 1 is a dismantled perspective view of the preferred embodiment of the present invention.

Referring to FIG. 1, an automotive window screen control device as constructed in accordance with the present invention is generally comprised of a base 1, a post assembly 2, and a window screen assembly 3. The base 1 has a plurality of fastening holes 111, two paralleled supports 12 and a control box 13 on a flat bottom 11 thereof at suitable locations. Each support 12 has a semi-circular notch 121 on the topmost edge thereof for holding the post assembly 2. The control box 13 has a winding shaft 131 at one end controlled by a motor (not shown) therein. The motor which is fastened inside the control box 13 is connected to the internal electric circuit of a car. The post assembly 2 consists of a tube holder 21, a telescopic tube 22, a head 23, and a screen holder 24. The tube holder 21 comprises a central tube 211, a cross beam 212 through the central tube 211, two wing walls 213 respectively extending outwards from the peripheral surface of the central tube 211 at two opposite sides and disposed above the cross beam 212, wherein the wing walls 213 each has holes 214 arranged on a vertical line for selectively fastening the screen holder 24. The telescopic tube 22 has a stub rod 221 at a bottom end thereof tightly fitting the central tube 211. By inserting the stub rod 221 into the boring bore of the central tube 211, the telescopic tube 22 is vertically held in the tube holder 21. The head 23 is made in a solid structure having a blind hole 231 and a hooked projection 232 (not shown) on a bottom edge thereof, a wire hole 283 through the body thereof at a right angle relative to the blind hole 231 for inserting a wire 132 which has one end wound on the winding shaft 131 and an opposite end connected to the window screen assembly 3. The screen holder 24 has two tenons 242 extending from a frame 241. By inserting the two tenons 242 in either two holes 214 at the same level on the two wing walls 213, the screen holder 24 is secured to the post assembly 2. The frame 241 of the screen holder 24 is made in a substantially tubular shape having a arc-shaped wall surface over a 180° angle. The window screen assembly 8 is comprised of an auto-reversible reel of screen 31, two opposite end plates 33 for securing to the body of a car, and a hanging plate 32 attached to the reel of screen 31 at one end. The hanging plate 82 has a hanging hole 321 for hanging on the hooked projection 232 of the head 23.

Installation of the present invention is easy. The base 1 is attached to the body of a car adjacent to the rear window thereof with the screen assembly 3 held in the frame 241 of the screen holder 24 which is secured to the tube holder 21 at a suitable level. By means of the operation of the motor 240 in the control box 13 or through manual operation, with a hand lever 242 the wire 132 can be taken up by the winding shaft 131 so as to hang up a screen from the auto-reversible reel of screen 31. When not in use, the wire 132 is released, and the screen of the auto-reversible reel of screen 31 is automatically pulled back. The total height of the device can be adjusted by means of the telescopic tube 2. By means of alternatively fastening the tenons 242 of screen holder 24 in the holes 214 on the wing walls 13, the angular position of the screen of the auto-reversible reel of screen 31 can be conveniently adjusted to fit the sloping of the window glass to be protected.

It is apparent that various modifications could be made to the present invention without departing from the basic teachings thereof. Recognizing that various modifications are apparent, the scope herein shall be deemed as defined in the claim set hereinafter.

What is claimed is:

1. An automotive window screen control device comprising:

a base, said base having two paralleled supports and a winding device on a top edge thereof, said two paralleled supports each having a circular notch at a top edge thereof, said winding device having a winding shaft and means for rotating said winding shaft;

a post assembly supported on said two paralleled supports and vertically extending therefrom; said post assembly comprising a tube holder supported on said two paralleled supports, a head, a telescopic tube connected between said tube holder and said head, and a screen holder, said tube holder comprising a central tube, a cross beam transversely connected through said central tube and supported on said two opposite paralleled supports at said circular notches, and two wing walls respectively extending outwardly from said central tube at two opposite sides and disposed above the cross beam, each of said wing walls having holes arranged on a vertical line, said head having a blind hole and a hooked projection on a bottom edge thereof, and a wire hole, said screen holder extending from a frame, said frame having an arc-shaped wall at an angle of 180° degrees and having two tenons alternatively releasably insertable in said holes on said wind walls;

an auto-reversible reel of screen held in said screen holder, said auto-reversible reel of screen having a screen attached with a hanging plate for releasably hanging on said hooked projection; and a wire, said wire having one end connected to and wound on said winding shaft and the opposite end inserted through said wire hole and connected to said hanging plate whereby by alternately inserting said tenons in said holes on said wing walls, the angular position of said screen is adjusted.

2. The automotive window screen control device of claim 1, wherein said winding device comprises a control box and said means for rotating said winding shaft is a hand lever located within said control box.

3. The automotive window screen control device of claim 1, wherein said means for rotating said winding shaft is a motor fastened inside said control box.

* * * * *